United States Patent
Ohnstein et al.

(10) Patent No.: US 9,658,404 B2
(45) Date of Patent: May 23, 2017

(54) OPTICAL BENCH

(71) Applicant: Honeywell International Inc., Morristown, NJ (US)

(72) Inventors: Thomas Ohnstein, Roseville, MN (US); Daniel Youngner, Maple Grove, MN (US); Mary Salit, Plymouth, MN (US); Jeff A. Ridley, Shorewood, MN (US)

(73) Assignee: Honeywell International Inc., Morris Plains, NJ (US)

( * ) Notice: Subject to any disclaimer, the term of this patent is extended or adjusted under 35 U.S.C. 154(b) by 84 days.

(21) Appl. No.: 14/686,501

(22) Filed: Apr. 14, 2015

(65) Prior Publication Data

US 2016/0306119 A1  Oct. 20, 2016

(51) Int. Cl.
*G02B 6/36* (2006.01)
*G02B 6/38* (2006.01)
*G02B 6/32* (2006.01)

(52) U.S. Cl.
CPC ............ *G02B 6/3652* (2013.01); *G02B 6/32* (2013.01); *G02B 6/3616* (2013.01); *G02B 6/3636* (2013.01); *G02B 6/3664* (2013.01); *G02B 6/3692* (2013.01)

(58) Field of Classification Search
None
See application file for complete search history.

(56) References Cited

U.S. PATENT DOCUMENTS

| | | | | |
|---|---|---|---|---|
| 4,290,667 A | * | 9/1981 | Chown | G02B 6/2817 264/1.25 |
| 4,826,272 A | * | 5/1989 | Pimpinella | H01L 31/0203 257/432 |
| 5,259,054 A | * | 11/1993 | Benzoni | G02B 6/4202 385/76 |

(Continued)

FOREIGN PATENT DOCUMENTS

| | | |
|---|---|---|
| EP | 1479648 A2 | 11/2004 |
| JP | 60068301 A * | 4/1985 |

(Continued)

OTHER PUBLICATIONS

Extended Search Report from Related European Patent Application No. 16154735, dated Aug. 29, 2016, 9 pp.

*Primary Examiner* — Michelle R Connelly
(74) *Attorney, Agent, or Firm* — Brooks, Cameron & Huebsch, PLLC (57) ABSTRACT

Methods, apparatuses, and systems for design, fabrication, and use of an optical bench, as well as alignment and attachment of optical fibers are described herein. One apparatus includes an apparatus body, a first channel within the apparatus body for positioning of a first optical fiber directed along a first axis and a second channel within the apparatus body for positioning of a second optical fiber directed along a second axis, wherein the first axis is orthogonal to the second axis. The apparatus also includes a third optical fiber directed along the second axis and an optical element positioned along the first channel and second channel to focus a first light beam from the first optical fiber along the first axis and focus a second light beam from the second optical fiber along the second axis.

14 Claims, 4 Drawing Sheets

(56) References Cited

U.S. PATENT DOCUMENTS

| | | | |
|---|---|---|---|
| 5,323,268 A * | 6/1994 | Kikuchi | G02B 3/005 359/653 |
| 6,332,051 B1 * | 12/2001 | Ai | G02B 27/1073 385/33 |
| 6,477,303 B1 * | 11/2002 | Witherspoon | G02B 6/32 385/35 |
| 6,751,369 B1 * | 6/2004 | Lewis | G02B 6/3582 385/18 |
| 7,180,078 B2 | 2/2007 | Pau et al. | |
| 7,476,041 B2 * | 1/2009 | Kopp | G02B 6/4203 385/139 |
| 7,701,638 B2 * | 4/2010 | Videen | G02B 27/144 356/337 |
| 2002/0163693 A1 * | 11/2002 | Rubissa | H04Q 11/0005 398/82 |
| 2002/0191917 A1 * | 12/2002 | Wu | G02B 6/29361 385/47 |
| 2003/0067049 A1 | 4/2003 | Steinberg et al. | |
| 2003/0185499 A1 * | 10/2003 | Butler | G02B 6/425 385/24 |
| 2004/0141694 A1 | 7/2004 | Lee et al. | |
| 2004/0190851 A1 * | 9/2004 | Garner | G02B 6/3672 385/137 |
| 2004/0208438 A1 * | 10/2004 | Faris | G02B 6/3556 385/31 |

FOREIGN PATENT DOCUMENTS

| | | | |
|---|---|---|---|
| JP | 61182008 A | * | 8/1986 |
| JP | 01025108 A | * | 1/1989 |
| JP | 11119123 A | * | 4/1999 |
| JP | 2002214484 A | * | 7/2002 |
| JP | 2005181000 A | * | 7/2005 |
| WO | 0028361 A1 | | 5/2000 |
| WO | 0188586 A2 | | 11/2001 |

* cited by examiner

Fig. 5

OPTICAL BENCH

STATEMENT OF GOVERNMENT RIGHTS

This invention was made with Government support under contract: W911 NF-12-1-0605, awarded by the U.S. Army. The Government has certain rights in this invention.

TECHNICAL FIELD

The present disclosure relates to methods, devices, and systems for design, fabrication, and use of an optical bench, as well as alignment and attachment of optical fibers.

BACKGROUND

Optical bench structures can facilitate integration of optical components to provide light paths and optical circuits. Trenches for light paths and mounting structures for optical components can be oriented such that light paths are constrained to a plane of the optical bench structure.

DETAILED DESCRIPTION

The embodiments of the present disclosure relate to methods, apparatuses, and systems for design, fabrication, and use of an optical bench, as well as alignment and attachment of optical components. In order to effectively utilize optical bench technology, the embodiments have to address the issues discussed above.

In doing so, there are several different issues which can arise from the use of some previous approaches to optical bench technology and adjustment and attachment of optical fibers that can be overcome. The first issue can arise from the use of single level optical circuits, which constrain components to one plane.

A second issue can arise when an optical source that is orthogonal to the plane of the optical bench is desired, as prior concepts have not been able to effectively provide such a structure. A third issue can arise when fiber bundles, which can require that the individual fibers to be oriented in different axes, are used in optical bench applications.

In the following detailed description, reference is made to the accompanying figures that form a part hereof. The figures show by way of illustration how one or more embodiments of the disclosure may be practiced.

The embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

It should be noted that although many of the figures provided herein provide visual views of example optical bench configurations and example alignments of optical fibers, the embodiments of the present disclosure can be accomplished by using different configurations, materials, and/or components. Further, as used herein, "a" or "a number of" something can refer to one or more such things. For example, "a number of optical components" can refer to one or more optical components.

Figure 1:
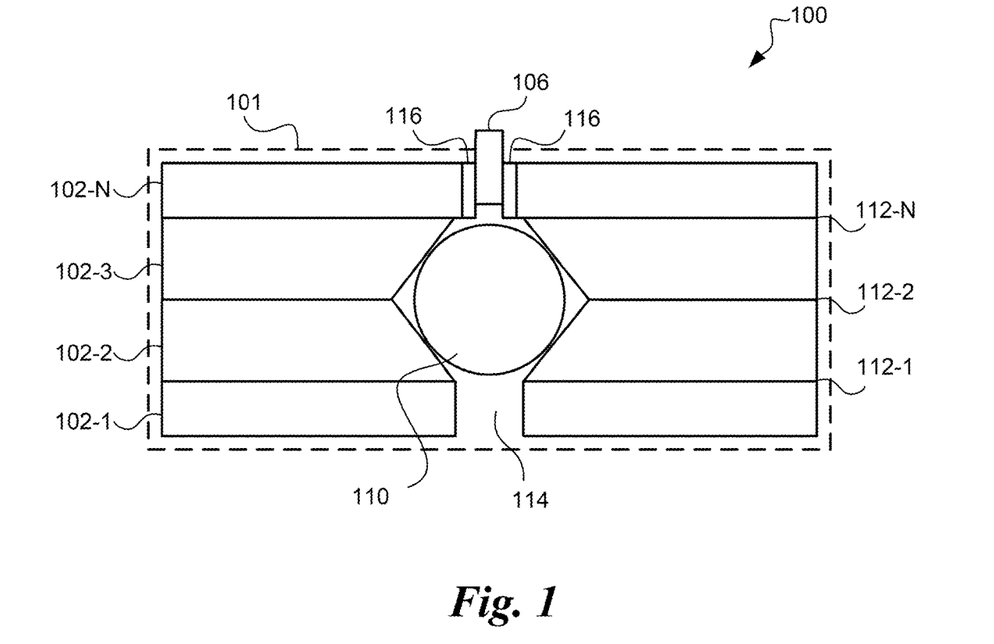
FIG. 1 provides an illustration of an example optical bench assembly.

FIG. 1 provides an illustration of an example optical bench assembly according to the present disclosure. As illustrated in FIG. 1, the assembly 100 can include a plurality of silicon wafers 102-1, 102-2, 102-3, . . . , 102-N can be stacked on top of each other to create a structure (e.g., structure 101) that can hold and align optical components. As used herein, "optical components" include optical fibers, optical lenses, beam splitters, mirrors, circulators, and/or polarizers used in optical circuits.

As used herein, a "wafer" is a thin slice or substrate of a semiconductor material or materials. For example, a "wafer" can be formed of a crystalline semiconductor material or one or multiple other suitable materials. A plurality of wafers, as described herein, can be stacked on top of one another to form a structure.

In some examples, the plurality of wafers 102-1, 102-2, 102-3, . . . , 102-N can be etched and/or bonded 112-1, 112-2, 112-N, etc. together to create a structure 101 that can hold and align a plurality of optical elements. Etching can include deep reactive ion etching (DRIE) or anisotropic etching, among other suitable techniques.

Bonding the plurality of wafers 102-1, 102-2, 102-3, . . . , 102-N can include using known bonding techniques. For example, the plurality of wafers 102-1, 102-2, 102-3, . . . , 102-N can be bonded together using a Solid-Liquid-Interdiffusion (SLID) Process, as discussed in more detail herein, among other wafer bonding techniques.

As can be seen in FIG. 1, an optical element 110 can be disposed in the plurality of silicon wafers 102-1, 102-2, 102-3, . . . , 102-N. For example, a ball lens 110 can be disposed inside structure 101. Embodiments are not so limited, however, and other lenses (e.g., one or more simple lenses, compound lenses, etc.) can be used in place of a ball lens 110.

As can further be seen in FIG. 1, an aperture 114 can be provided through the plurality of silicon wafers 102-1, 102-2, 102-3, . . . , 102-N. Aperture 114 can extend through all the silicon wafers 102-1, 102-2, 102-3, . . . , 102-N such that light can pass through the structure 101 orthogonal to a plane formed by the plurality of silicon wafers 102-1, 102-2, 102-3, . . . , 102-N (i.e., orthogonal to the plane of elongation of the wafers). A structure 116 can be provided in a portion of aperture 114 to facilitate connection to the fiber 106.

One example apparatus embodiment includes an apparatus body and a first channel within the apparatus body for positioning of a first optical fiber directed along a first axis. The apparatus also includes a second channel within the apparatus body for positioning of a second optical fiber directed along a second axis, wherein the first axis is orthogonal to the second axis and a third optical fiber directed along the second axis. An optical element is positioned along the first channel and second channel and can be used to focus a first light beam from the first optical fiber along the first axis and focus a second light beam from the second optical fiber along the second axis.

Some embodiments also include at least one v-groove slot at one end of at least one of the first channel and the second channel to provide passive alignment for at least one of the first optical fiber, second optical fiber, or third optical fiber. In this manner, the optical fibers can be easily aligned with the assembly making the overall assembly easy to use and requiring less skill in setting up the assembly, among other benefits.

In some embodiments, the optical element can be disposed in a substantially pyramid-shaped opening in the apparatus body. The optical element can focus a third light beam along a third axis that is orthogonal to both the first and second axes. In some embodiments, a keyed fiber slot structure can be disposed in at least a portion of an aperture formed in the apparatus body. The keyed fiber slot structure can connect at least one of the optical fibers to the apparatus body, for example.

In another example embodiment, an optical bench apparatus includes a stack of semiconductor wafers and a plurality of spaces formed within the stack of semiconductor wafers, wherein the surfaces of the semiconductor wafers forming the spaces are shaped to hold and align the optical elements. The embodiment also includes an optical element positioned in a space formed within the stack of semiconductor wafers and a plurality of optical fiber apertures to receive a plurality of optical fibers and to direct a light beam out of one or more of the optical fibers and into the optical element.

Some such embodiments can include a second optical element positioned in a space formed within the stack of semiconductor wafers, a third optical element positioned in a space formed within the stack of semiconductor wafers, and a plurality of optical fiber apertures to receive a plurality of optical fibers and to direct a light beam out of each optical fiber and into the optical elements. The second optical element can have a diameter that is different from a diameter of the third optical element. A keyed fiber slot structure can be formed in at least one of the plurality of optical fiber apertures. For example, in some embodiments, one or more of the plurality of spaces can be an anisotropically etched pyramid shape.

In some embodiments, the optical element can direct a path of the light beam along a first axis, direct a path of the light beam along a second axis, and direct a path of the light beam along a third axis, where the first axis is orthogonal to the second axis and the third axis is orthogonal to the first axis and the second axis. As a further example, in some embodiments, the optical element can collimate the light beam.

Figure 2:
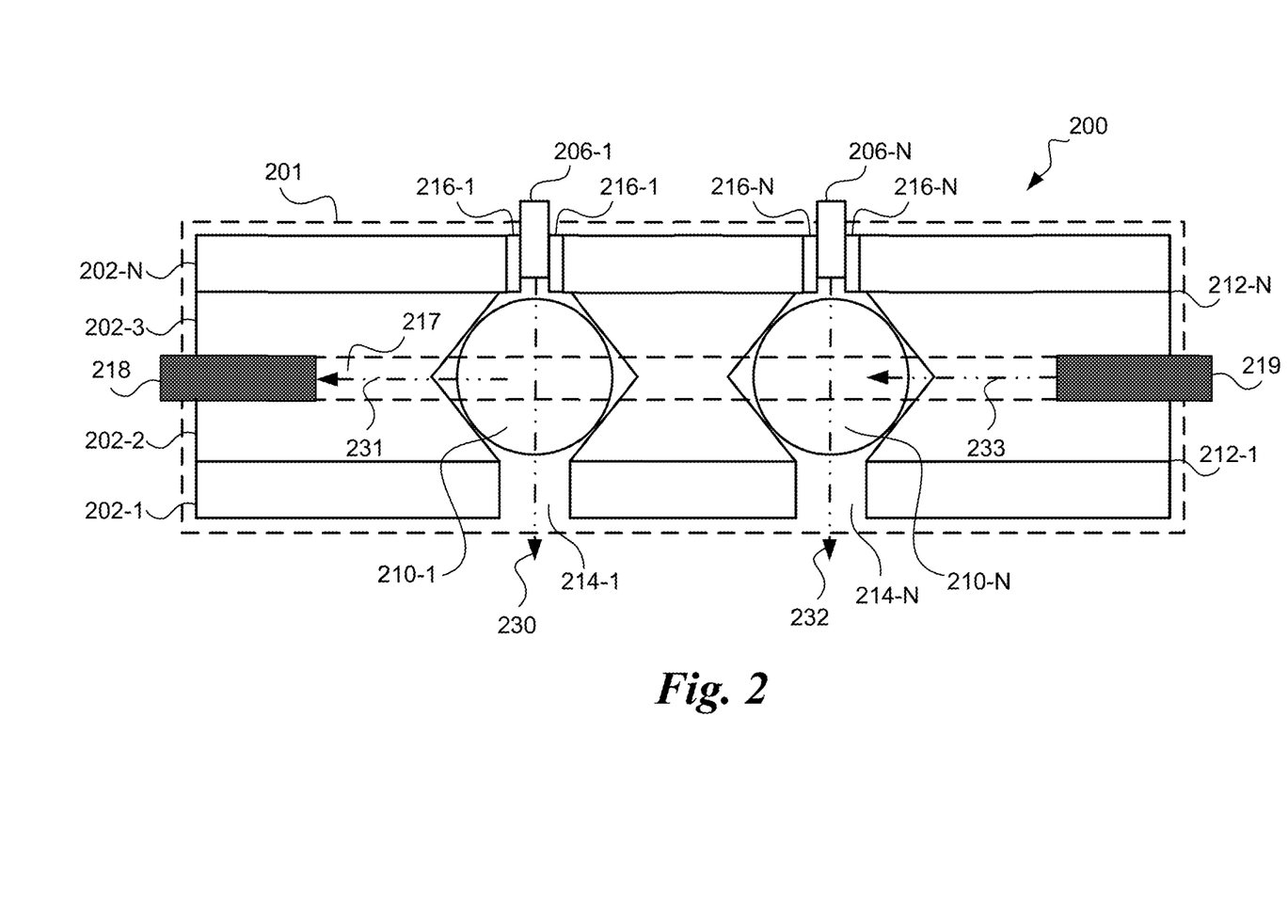
FIG. 2 illustrates an example optical bench assembly including optical fibers to provide beam paths parallel and perpendicular to the plane of a wafer.

FIG. 2 illustrates an example optical bench assembly including optical fibers to provide beam paths both parallel and perpendicular to a plane formed by the plurality of silicon wafers. As used herein, a "beam path" is a path along which light travels (e.g., beam paths 230, 231, 232, 233, etc.). In this regard, beam paths 230, 231, 232, 233 can be provided along at least two axes. Embodiments are not limited to providing beam paths along two axes, however, and beam paths can be provided along three axes, as discussed in more detail in connection with FIG. 3, herein.

Similar to the example illustrated in FIG. 1, the assembly 200 includes a plurality of silicon wafers 202-1, 202-2, 202-3, ..., 202-N that can be stacked and/or formed on top of one another. The plurality of silicon wafers 202-1, 202-2, 202-3, ..., 202-N can be etched and/or bonded at junctions 212-1, 212-N, to one another.

As illustrated in FIG. 2, a plurality of optical elements 210-1, 210-N can be provided inside the wafer structure 201. In the example illustrated in FIG. 2, the lenses 210-1, 210-N can be ball lenses. A plurality of first apertures 214-1, 214-N (e.g., vertical apertures) can be formed in one or more of the plurality of silicon wafers 202-1, 202-2, 202-3, ..., 202-N. A keyed slot structure 216-1, 216-N, for example, a keyed fiber slot structure as described in more detail herein, can be provided to position and/or orient an optical fiber 206-1, 206-N, which can be provided to each aperture 214-1, 214-N.

In the example illustrated in FIG. 2, each of the beam paths 230 and 232 pass through one of the plurality of vertical apertures 214-1, 214-N. The beam paths 230, 232 can, for example, be focused from a fiber output to a spot outside the optical bench 200. For instance, the beam path 230 can enter the structure 201 via optical fiber 206-1 be focused through optical element 210-1, and travel out of the structure 201 through aperture 214-1. In some embodiments, one or more beam paths 230, 231, 232, 233 can be collimated through optical element 206-1.

An elongate groove 217 (e.g., in the plane of the plurality of wafers 202-1, 202-2, or horizontal in FIG. 2) can be provided in the structure 201 to receive one or more optical fibers 218, 219. In some embodiments, the groove 217 can have a substantially V-shaped cross-section when viewed along its elongate axis.

As a further example, the groove 217 can be disposed in a plane formed between silicon wafer 202-2 and silicon wafer 202-3. That is, in some embodiments, groove 217 can be formed between silicon wafer 202-2 and silicon wafer 202-3.

In some embodiments, a portion of the groove 217 can be formed in wafer 202-2 and/or in some cases, a portion of the groove 217 can be formed in wafer 202-3. Each portion of the groove 217 formed in the wafers 202-2, 202-3 can be formed such that the portions of the groove 217 align and form a single groove 217. For example, half of the groove 217 can be formed in wafer 202-2 and half of groove 217 can be formed in wafer 202-3 such that the portions of the groove align when wafer 202-2 and wafer 202-3 are in contact.

In some embodiments, the groove can be an elongated bottom channel portion (e.g., a bottom channel portion having a V-shaped cross-section) formed in wafer 202-2. An elongate top channel portion (e.g., a top channel portion having an inverted V-shaped cross-section) can be formed in wafer 202-3 wherein the bottom and top channel portions form a channel for passage of a light beam (e.g., V-shape and inverted-V shape combining to form an elongate channel having a square cross-section).

As can further be seen in FIG. 2, an optical fiber-to-fiber coupling circuit can be formed by the optical fibers 218, 219 and the ball lenses 210-1, 210-N. That is, in some embodiments, ball lenses 210-1, 210-N can focus beam path 233 coming out of optical fiber 219 into optical fiber 218, thereby coupling a beam path 231, 233 between optical fiber 219 and optical fiber 218. In some embodiments, a fiber-to-fiber coupler and can provide optical coupling between the optical fibers 218 and 219.

The example shown in FIG. 2 illustrates only one level of optical circuits in the vertical and horizontal planes; however, embodiments are not so limited to the structure and components illustrated in FIG. 2. For example, the structure 201 illustrated in FIG. 2 can extend in all directions beyond what is shown in FIG. 2.

In some examples, additional levels of optical circuits and/or integrated optical systems can be provided in the structure 201 and/or can be coupled thereto. Additional optical circuits and/or integrated systems can be separate from (e.g., not coupled to) the optical circuits used in the optical bench assembly 200, and may instead be coupled to and/or provided by other optical elements (not shown). Further, in some embodiments, there may be multiple beam paths formed along one plane that intersect at a central point (e.g., the center of lens 210-1). Additionally, some embodiments can include multiple planes having beam paths intersecting at the central point and some may be at non-perpendicular angles to other planes.

Figures 3, 4:
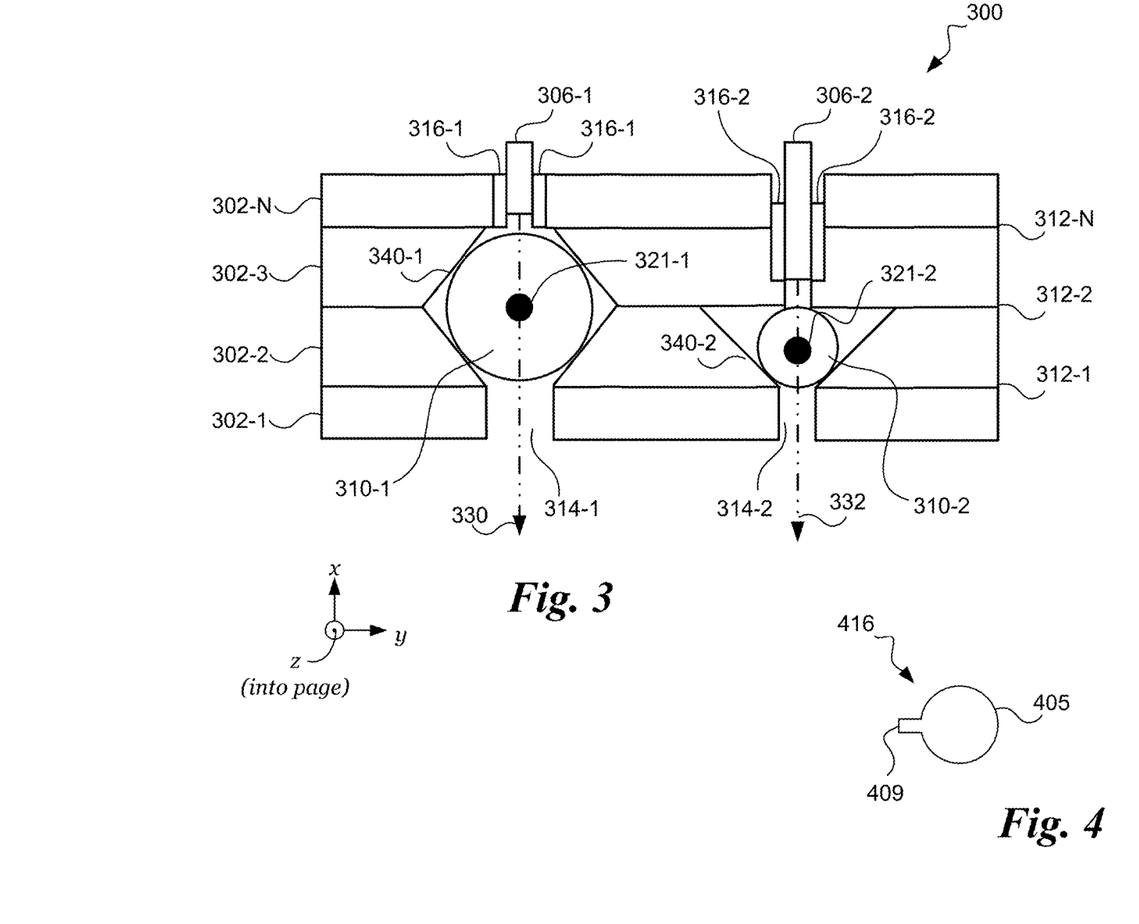
FIG. 3 illustrates an example optical bench assembly including optical elements of different sizes.
FIG. 4 illustrates an example of a keyed fiber slot structure to position and orient an optical fiber.

FIG. 3 illustrates an example optical bench assembly 300 including optical elements of different sizes. Similar to the examples illustrated in FIGS. 1 and 2, the assembly 300 includes a plurality of silicon wafers 302-1, 302-2, 302-3, . . . , 302-N can be stacked and/or formed on top of one another. The plurality of silicon wafers 302-1, 302-2, 302-3, . . . , 302-N can be etched and/or bonded at junctions 312-1, 312-2, 312-N, to one another. Beam paths 231, 233 along the y-axis, groove 217, and optical fibers 218, 219, illustrated in FIG. 2, are not shown in FIG. 3 so as not to obfuscate other elements illustrated in FIG. 3. However, as one of ordinary skill in the art will appreciate, assembly 300 can include the beam paths 231, 233 and/or optical fibers 218, 219 illustrated in FIG. 2.

The example illustrated in FIG. 3 shows a cross section taken along the z-axis, which extends into the page. A plurality of apertures 314-1, 314-2, etc. can be provided such that optical fibers 306-1, 306-2 can direct light in and out of the cell. In some embodiments, at least a first portion of a keyed fiber slot 316-1, 316-2 can be formed on the inside of the apertures 314-1, 314-2. This mechanism can be formed so as to provide alignment, orientation, and/or locking of the optical fiber(s) 306-1, 306-2 into the apertures. In some such embodiments, as described in more detail in connection with FIG. 4, herein, the optical fibers 306-1, 306-2 can include a second portion of the locking mechanism that is a reciprocal shape that will interface with the first portion provided in the aperture 314-1, 314-2 in such a manner as to mechanically lock the fiber to the aperture.

In some embodiments, the optical bench assembly 300 illustrated in FIG. 3 can be designed as a unit cell. As an example, the unit cell can be repeated across a 2 dimensional or 3 dimensional array.

The optical bench assembly 300 can be fabricated using silicon optical bench (SiOB) techniques. For example, anisotropic and deep reactive ion (DRIE) etching techniques can be used in fabricating the optical bench assembly 300. In some embodiments, anisotropic etching can be used to create grooves (e.g., groove 217 illustrated in FIG. 2) and/or angle-walled structures 340-1, 340-2. The grooves (e.g., groove 217 illustrated in FIG. 2) can be substantially V-shaped, and the angle-walled structures 340-1, 340-2 can be substantially pyramid-shaped or inverted pyramid shaped.

As discussed in connection with FIG. 2, herein, optical fibers (e.g., optical fibers 218 and 219 illustrated in FIG. 2) can be provided in the grooves (e.g., groove 217 illustrated in FIG. 2), and optical elements 310-1, 310-2 can be provided in the angle-walled structures 340-1, 340-2. In some embodiments, a groove structure (e.g., groove 217) and/or an angle-walled structures 340-1, 340-2 can be used to provide passive alignment of various optical components disposed in the optical bench assembly 300.

In some embodiments, DRIE can be used to create straight-walled etched structures in silicon to hold additional optical components not illustrated in FIG. 3. For example, beam splitters, polarizers, etc. can be provided in the optical bench assembly 300 and/or can be coupled to the optical bench assembly 300. In some embodiments, a beam splitter can be provided in the optical bench assembly 300 to direct beam paths 321-1, 321-2 into or out of the page (e.g., along the z-axis).

FIG. 4 illustrates an example of a keyed fiber slot structure 416 to position and orient an optical fiber. The example illustrated in FIG. 4 shows a top view of the keyed fiber slot structure 416. The keyed fiber slot structure can include a first portion 405 and a second portion 409.

In some embodiments, an optical fiber (e.g., optical fiber 306-1 illustrated in FIG. 3) can be fitted with a ferrule. The ferrule can include an alignment key that can provide a physical, locking connection between the keyed fiber slot structure 416 and the ferrule. The ferrule can be constructed out of metal, plastics, or other suitable material. In some embodiments, the alignment key of the ferrule match and/or identify a fiber axis to be used with a polarization maintaining fiber, for example. Embodiments are not limited to a ferrule, and other structures, e.g., a collet, or other suitable structure, are contemplated within the scope of the disclosure.

The keyed fiber slot structure 416 can be provided (e.g., etched, machined, etc.) into the optical bench assembly 300. Embodiments include providing the keyed fiber slot structure 416 such that the fiber axis is aligned with the optical components and/or circuitry when the alignment key of the ferrule is connected and locked with the keyed fiber slot structure 416.

An example method of fabrication for one or more embodiments contained herein is presented below. In some embodiments, a structure can be formed from a plurality of wafers that can be formed and/or bonded together in a sequential order. The wafers can be made from a semiconductor material and/or combination of semiconductor materials. In some embodiments, the first wafers can be silicon wafers.

In the following example, forming extrusions, e.g., apertures, holes, grooves, angle-walled structures, etc. can be accomplished, for example, using various etching techniques. For instance, anisotropic etching or deep reactive ion etching (DRIE) can be used to form such extrusions. Anisotropic etching and DRIE are different etching techniques in the context of device fabrication.

The width, length, and/or height of the extrusions, and/or optical components can be the same and/or different from one another. For example, the thickness of the wafers can be selected to be the same or different for different applications. The relative spatial positions of such extrusions, and/or optical components can be arranged in different spatial configurations.

Further, dimensions (e.g., lengths, depths, angles, diameters, etc.) of the extrusions, and/or optical components can be formed to be different from one another. For example, thicknesses of the wafers and the dimensions of the extrusions can be formed to accommodate various optical components of different dimensions.

A first wafer can be provided. A plurality of apertures can be formed in a first wafer. In some embodiments, one or more of the plurality of apertures can be straight sidewall holes that can be etched through the wafer.

In some embodiments, the first wafer can operate to protect at least a portion of an optical element disposed inside the structure and/or can provide a space for a beam path and/or optical fiber. For example, the first wafer can operate to protect one or more optical components in case the optical component(s) protrude beyond a second wafer, as discussed in more detail below.

Further, a second wafer can be provided. The second wafer can be formed to provide at least a portion of one or more extrusions to hold, position, and/or align a plurality of optical components. For example, a plurality of angle-walled structures and/or grooves can be formed in the second wafer.

In some embodiments, the angle-walled structures can substantially pyramid shaped (i.e., multiple angled side walls coming to a point or a shape in which the top is not part of the shape (truncated pyramid)), and the grooves can be V-shaped grooves. Examples are not so limited, however, and the angle-walled structures and/or grooves can be formed in combinations of angles and/or orientations that can facilitate deployment of the optical systems described herein.

The angle-walled extrusions can be formed in the second wafer to hold an optical element and/or optical fiber(s). For example, angle-walled extrusions can be formed in a substantially pyramid shape in the second wafer such that an optical element can be held therein.

In some embodiments, etches can be formed along particular planes in the wafer(s). For example, forming angle-walled structures and/or grooves in the wafer(s) can be carried out via etching along specific crystal planes. Some embodiments can include etching along a plane to form pyramid angle-walled structures and/or substantially V-shaped grooves. For example, etching can include etching the silicon <100> plane and stopping on the <111> planes.

Examples include forming extrusions in the second wafer that extend through the second wafer such that a beam path can pass through an optical element disposed in an angle-walled structure on the second wafer. In this regard, the extrusions can be formed so as to hold an optical element while allowing a beam path to pass through the optical element.

The first wafer and the second wafer can be adhered and/or bonded together. In some embodiments, the first wafer and the second wafer can be bonded together using an adhesive that is compatible with the wafers and with the optical components provided in the structure. Additional wafers can be bonded to the first and second wafer to create a stack structure.

In some embodiments, the first wafer and second wafer can be bonded together using a Solid-Liquid-Interdiffusion (SLID) Process bonding technique. The SLID process uses a metal system of Gold-Indium (Au—In), for example, to form a bond between two wafers at a relatively low temperature (200° C. to 250° C.). This process temperature is much lower than a typical metal-Silicon eutectic bond such as Au—Si at 360° C. Once this bond between the wafers is formed, unbonding requires much higher temperatures (greater than 350° C.) than that used to form the bond. Advantageously, the relatively low temperatures indicative of SLID wafer bonding can protect the optical components during the stack formation process.

Additional wafers can then be bonded in sequence at the same low temperature of formation while the previous wafer bonds remain intact. In some embodiments, the SLID process can be repeated to form the entire stack of wafers. Embodiments are not limited to the SLID process; however, and other bonding processes are contemplated within the scope of the present disclosure.

In some embodiments, a third wafer can be utilized. The third wafer can be formed to provide at least a portion of one or more extrusions to hold, position, and/or align a plurality of optical components. For example, a plurality of angle-walled structures and/or grooves can be formed in the third wafer.

In some embodiments, the angle-walled structures can substantially pyramid shaped, and the grooves can be V-shaped grooves. Examples are not so limited, however, and the angle-walled structures and/or grooves can be formed in combinations of angles and/or orientations that can facilitate deployment of the optical systems described herein.

One or more of the extrusions provided in the third wafer can correspond to similar elements in the second wafer. For example, the plurality of angle-walled structures formed in the second and third wafers can align with each other to hold, position, and/or align a plurality of optical components that can be provided in the structure.

Similarly, the grooves formed in the second and third wafers can hold, position, and/or align one or more optical fibers that can be provided in the structure. In some embodiments, the dimensions of the angle-walled structure(s) can be formed such that a beam path can pass through an optical element disposed in an angle-walled structure on the third wafer.

Optical components can be placed in the extrusions formed in the second and third wafers, and the third wafer can be adhered or bonded to the second wafer, as described with respect to the first and second wafers. In some embodiments, the optical components can be placed in corresponding extrusions using pick-and-place machinery and/or similar automated processes.

The extrusions can provide alignment of the optical components disposed in the structure. For example, the extrusions can be formed so as to passively align the optical components in the structure. That is, the optical elements can be passively aligned by the angle-walled structures and optical fibers can be passively aligned by the grooves. A fourth wafer can be provided. A plurality of apertures can be formed in the fourth wafer. In some embodiments, one or more of the plurality of apertures can be straight sidewall holes that can be etched through the wafer.

In some embodiments, the fourth wafer can operate to protect at least a portion of an optical element disposed inside the structure and/or can provide a space for a beam path and/or optical fiber. For example, the fourth wafer can operate to protect one or more optical components in case the optical component(s) protrude beyond the third wafer.

Figure 5:
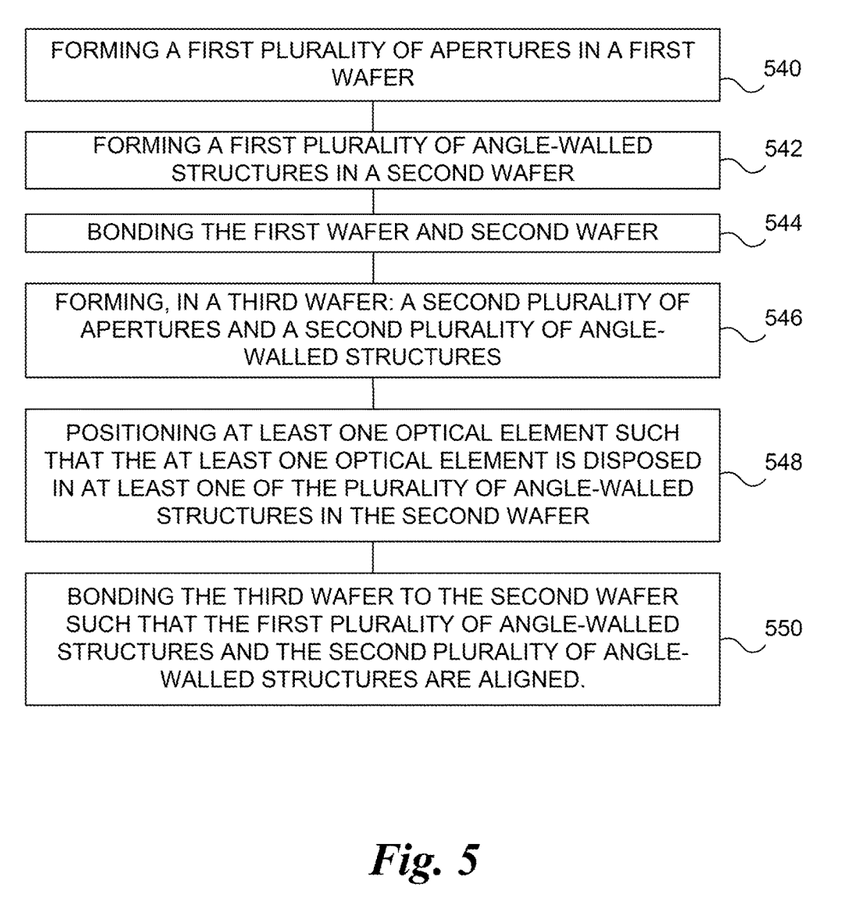
FIG. 5 illustrates an example flow chart of an example method for fabricating an optical bench.

FIG. 5 illustrates an example flow chart of an example method for fabricating an optical bench. In this embodiment, the process can include forming a first plurality of apertures in a first wafer, at block 540. For example, in the embodiment of FIG. 2, the first wafer includes one or more apertures that can be used to allow a beam to enter or exit the assembly.

At block 542, the method includes forming a first plurality of angle-walled structures in a second wafer. These can be the top portions of the spaces used to hold the optical elements (e.g., elements 210-1, 210-N).

In various embodiments, the method can include bonding the first wafer and the second wafer, such as at block 544. The method can also include forming, in a third wafer, a second plurality of apertures, wherein at least one of the second plurality of apertures is formed to a larger diameter than at least one of the first plurality of apertures and a second plurality of angle-walled structures, at block 546. These structures can be, for example, the bottom portions of the spaces used to hold the one or more optical elements and one or more beam paths.

The method can also include positioning at least one optical element such that the at least one optical element is disposed in at least one of the plurality of angle-walled structures in the second wafer, at block 548. The placement of the optical element allows for the element to be captured within the layers which can be beneficial in ease of setup of the system since the optical element is fitted into the walled structures and positioned with respect to the apertures based on the shape of the optical element and that of the walled structure.

At block 550, the method includes bonding the third wafer to the second wafer such that the first plurality of angle-walled structures and the second plurality of angle-walled structures are aligned. In this manner, the optical element is positioned within the wafer structure which forms a body of the assembly with the optical elements positioned inside the body.

In some embodiments, the example method of fabrication can include forming a third plurality of apertures in a fourth wafer, and bonding the fourth wafer to the third wafer. The first plurality of angle-walled structures and the second plurality of angle-walled structures can be formed in a substantially pyramid shape. In some embodiments, a slot can be formed in at least one of the third plurality of apertures to provide alignment for at least one optical fiber. As an example, the slot can comprise a keyed fiber slot.

In some embodiments, the method can include forming a first portion of a groove in the second wafer and forming a second portion of a groove in the third wafer, wherein the first portion of the groove and the second portion of the groove align to form the groove. The first portion of the groove and the second portion of the groove are substantially V-shaped. In some embodiments, the first portion of the groove and the second portion of the groove are formed by an extrusion along a plane having Miller indices <1 1 1>.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. In the foregoing Detailed Description, various features are grouped together in example embodiments illustrated in the figures for the purpose of streamlining the disclosure. Rather, inventive subject matter lies in less than all features of a single disclosed embodiment.

What is claimed:

1. An apparatus, comprising:
   an apparatus body;
   a first channel within the apparatus body for positioning of a first optical fiber directed along a first axis;
   a second channel within the apparatus body for positioning of a second optical fiber directed along a second axis, wherein the first axis is orthogonal to the second axis;
   a third optical fiber directed along the second axis;
   an optical element positioned along the first channel and second channel to:
      focus a first light beam from the first optical fiber along the first axis; and
      focus a second light beam from the second optical fiber along the second axis; and
   a keyed fiber slot structure disposed in at least a portion of an aperture formed in the apparatus body, wherein the keyed fiber slot structure is to connect at least one of the first optical fiber, the second optical fiber, and the third optical fiber to the apparatus body.

2. The apparatus of claim 1, the optical element to focus a third light beam along a third axis, wherein the third axis is orthogonal to the first axis and the second axis.

3. The apparatus of claim 1, wherein the optical element is disposed in a substantially pyramid-shaped opening in the apparatus body.

4. The apparatus of claim 1, wherein the first channel and second channel are substantially V-shaped.

5. The apparatus of claim 1, comprising at least one slot at one end of at least one of the first channel and the second channel to provide passive alignment for at least one of the first optical fiber, second optical fiber, or third optical fiber.

6. An optical bench apparatus, comprising:
   a stack of semiconductor wafers;
   a plurality of spaces formed within the stack of semiconductor wafers, wherein the surfaces of the semiconductor wafers forming the spaces are shaped to hold and align the optical elements;
   a first optical element, a second optical element, and a third optical element each positioned in a space formed within the stack of semiconductor wafers;
   a plurality of optical fiber apertures to receive a plurality of optical fibers and to direct a light beam out of each optical fiber and into the optical elements; and
   a keyed fiber slot structure formed in at least one of the plurality of optical fiber apertures.

7. The apparatus of claim 6, wherein at least one of the plurality of spaces is substantially pyramid shaped.

8. The apparatus of claim 6, the optical element to:
   direct a path of the light beam along a first axis;
   direct a path of the light beam along a second axis; and
   direct a path of the light beam along a third axis,
   wherein the first axis is orthogonal to the second axis and the third axis is orthogonal to the first axis and the second axis.

9. The apparatus of claim 6, the optical element to collimate the light beam.

10. The apparatus of claim 6, wherein the second optical element has a diameter that is different from a diameter of the third optical element.

11. A method, comprising:
    forming a first plurality of apertures in a first wafer;
    forming a first plurality of angle-walled structures in a second wafer;
    bonding the first wafer and the second wafer;
    forming, in a third wafer:
       a second plurality of apertures, wherein at least one of the second plurality of apertures is formed to a larger diameter than at least one of the first plurality of apertures; and
       a second plurality of angle-walled structures;

forming at least one optical element such that the at least one optical element is disposed in at least one of the plurality of angle-walled structures in the second wafer;

bonding the third wafer to the second wafer such that the first plurality of angle-walled structures and the second plurality of angle-walled structures are aligned;

forming a third plurality of apertures in a fourth wafer;

forming a keyed fiber slot in at least one aperture of the third plurality of apertures to provide alignment for at least one optical fiber; and bonding the fourth wafer to the third wafer.

12. The method of claim 11, wherein the first plurality of angle-walled structures and the second plurality of angle-walled structures are formed in a substantially pyramid shape.

13. The method of 11, comprising:

forming a first portion of a groove in the second wafer; and forming a second portion of a groove in the third wafer, wherein the first portion of the groove and the second portion of the groove align to form the groove.

14. The method of 13, wherein the first portion of the groove and the second portion of the groove are substantially V-shaped.

* * * * *